United States Patent
Larsen et al.

(10) Patent No.: US 7,688,678 B2
(45) Date of Patent: Mar. 30, 2010

(54) ROOM VOLUME AND ROOM DIMENSION ESTIMATION

(75) Inventors: Erik Larsen, Cambridge, MA (US);
Albert Feng, Champaign, IL (US);
Douglas L. Jones, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1182 days.

(21) Appl. No.: 11/259,619

(22) Filed: Oct. 26, 2005

(65) Prior Publication Data

US 2006/0126858 A1   Jun. 15, 2006

Related U.S. Application Data

(63) Continuation of application No. PCT/US2004/013040, filed on Apr. 28, 2004.

(60) Provisional application No. 60/466,153, filed on Apr. 28, 2003.

(51) Int. Cl.
*G01B 17/00* (2006.01)
(52) U.S. Cl. .................. 367/99; 702/156
(58) Field of Classification Search .......... 367/99, 367/118, 127; 702/156, 155, 171
See application file for complete search history.

(56) References Cited

U.S. PATENT DOCUMENTS

| | | |
|---|---|---|
| 4,312,053 A | 1/1982 | Lipsky |
| 4,590,591 A | 5/1986 | Leroy et al. |
| 5,729,612 A | 3/1998 | Abel et al. |
| 5,774,562 A | 6/1998 | Furuya et al. |
| 5,784,339 A | 7/1998 | Woodsum et al. |
| 5,792,072 A | 8/1998 | Keefe |
| 5,818,945 A | 10/1998 | Makino et al. |
| 5,940,499 A | 8/1999 | Fujii et al. |
| 6,130,949 A | 10/2000 | Aoki et al. |
| 6,219,645 B1 | 4/2001 | Byers |
| 6,243,322 B1 | 6/2001 | Zakarauskas |
| 6,279,379 B1 | 8/2001 | Logue et al. |

(Continued)

FOREIGN PATENT DOCUMENTS

WO     WO 02/090902 A2     11/2002

(Continued)

OTHER PUBLICATIONS

K.S. Tang, K.F. Man, S. Kwong and Q. He, Genetic Algorithms and their Applications, Signal Processing Magazine, IEEE, Nov. 1996, pp. 22-37, vol. 13, Issue 6.

(Continued)

*Primary Examiner*—Dan Pihulic
(74) *Attorney, Agent, or Firm*—L. Scott Paynter; Krieg DeVault LLP (57) ABSTRACT

One embodiment of the invention includes a processing subsystem (30) responsive to the detection of sound coming from a room (26) to establish an acoustic impulse response for the room (26), and determine a number of sound reflections corresponding to the impulse response. This subsystem (30) is further operable to determine volume of the room (26), one or more dimensions of the room (26) and/or at least one absorption coefficient of a room boundary as a function of the sound reflections.

25 Claims, 4 Drawing Sheets

U.S. PATENT DOCUMENTS

| | | |
|---|---|---|
| 2003/0014248 A1 | 1/2003 | Vetter |
| 2003/0103561 A1 | 6/2003 | Rickard et al. |
| 2003/0112983 A1 | 6/2003 | Rosca et al. |
| 2004/0213415 A1* | 10/2004 | Rama et al. .................. 381/63 |
| 2006/0126858 A1* | 6/2006 | Larsen et al. ................. 381/63 |
| 2008/0002833 A1* | 1/2008 | Kuster ......................... 381/63 |

FOREIGN PATENT DOCUMENTS

| | | |
|---|---|---|
| WO | WO 2004097350 A2 * | 11/2004 |

OTHER PUBLICATIONS

R. Ratnam et al., Blind Estimation of Reverberation Time, Beckman Institute for Advanced Science and Technology, Mar. 14, 2003; Acoustical Society of America.

S. Kirkpatrick, et al., Optimization by Simulated Annealing, Science, May 13, 1983, pp. 671-680, vol. 220, Issue 4598.

S. Charleston et al., Interference Cancellation in Respiratory Sounds via a Multiresolution Joint Time-Delay and Signal-Estimation Scheme, IEEE, Oct. 1997, pp. 1006-1019, vol. 44.

M.R. Azimi-Sadjadi et al., A new Time Delay Estimation in Subbands for Resolving Multiple Specular Reflections, IEEE Dec. 1998, pp. 3398-3403, vol. 46, No. 12.

J. Benesty, Adaptive Eigenvalue Decomposition Algorithm for Passive Acoustic Source Localization, Jan. 2000, J. Acoust. Soc. Am. 107(1), pp. 384-391.

M. Brandstein, Time-Delay Estimation of Reverberated Speech Exploiting Harmonic Structure, The Journal of the Acoustical Soc. of Am., May 1999. pp. 2914-2919, vol. 105, Issue 5.

Y. Huang et al., A Class of Frequency-Domain Adaptive Approaches to Blind Multichannel Identification, IEEE Jan. 2003, pp. 11-24, vol. 51, No. 1.

K.C. Ho et al., Rapid Identification of a Sparse Impulse Response Using an Adaptive Algorithm in the Haar Domain, IEEE Mar. 2003, pp. 628-638; vol. 51, No. 3.

B. Kingsbury et al., Recognizing Reverberant Speech with Rasta-PLP, ICASSP-97, Munich, vol. 2, pp. 1259-1262, 1997.

B. Gunel, Room Shape and Size Estimation Using Directional Impulse Response Measurements, Sonic Arts Research Centre (SARC), Queen's University Belfast, Belfast, UK, Sep. 2002.

B. Dalenback, Reverberation time, diffuse reflection, Sabine, and computerized prediction—part I, web article, 2000, RPG Diffusor Systems, Inc.

C. Kotropoulos et al., Adaptive LMS L-filters for noise suppression in images, Dept. of Informatics, Aristotle University of Thessaloniki, 1996.

L. Couvreur et al., Model-based Blind Estimation of Reverberation Time: Application to Robust ASR in Reverberant Environments, Faculte Polytechnique de Mons, Belgium, 2001.

* cited by examiner

ROOM VOLUME AND ROOM DIMENSION ESTIMATION

CROSS-REFERENCE TO RELATED APPLICATIONS

The present application is a continuation of International Patent Application Number PCT/US2004/013040 filed 28 Apr. 2004, which claims the benefit of U.S. Provisional Patent Application No. 60/466,153 filed 28 Apr. 2003. International Patent Application Number PCT/US2004/013040 and U.S. Provisional Patent Application No. 60/466,153 are each hereby incorporated by reference in its entirety.

GOVERNMENT RIGHTS

This invention was made with Government support under Contract Number R21-DC-04840 awarded by the National Institute of Health (NIH). The Government has certain rights in the invention.

BACKGROUND

The present invention relates to the determination of room size from acoustic signals, and more particularly, but not exclusively relates to the determination of room volume, one or more room dimensions, and/or one or more absorption coefficients from sound reflections.

Frequently, it is desirable to know the size of a room. The size may be provided in terms of volume and/or one or more room dimensions. Moreover, the ability to determine such information can be of significance for various applications, such as hearing-assistance devices, hands-free telephony equipment, speech recognition devices, telepresence/teleconference equipment, and/or sound level evaluation equipment. Accordingly, there is a need for further contributions in this area of technology.

SUMMARY

One embodiment of the present invention includes a unique technique for determining room size. Other embodiments include unique processes, methods, systems, devices, and apparatus to determine size of a room, including but not limited to volume, one or more dimensions, and/or one or more absorption coefficients at the room boundaries. As used herein, "room" broadly includes any type of structure that at least partially encloses a volume, and corresponding can be any type of enclosure. As used herein, "sound" broadly includes any acoustic energy waveform regardless of frequency, and correspondingly refers to any acoustic energy wave with a frequency inside or outside the range of normal human hearing.

Another embodiment of the present invention includes: detecting sound coming from a room; establishing an acoustic impulse response of the room; determining a number of sound reflections corresponding to the impulse response; and determining volume of the room as a function of these sound reflections.

Still another embodiment includes: detecting sound reflected from one or more surfaces of a room; counting a number of sound reflections from the one or more surfaces over a selected time interval; and estimating volume of the room as a function of the number of sound reflections and the time interval.

Yet another embodiment includes: detecting a number of sound reflections of a room in response to an impulsive sound; determining one or more values corresponding to reverberation time from the number of sound reflections based on a mirror image model; and estimating at least one of a dimension of the room and an acoustic absorption coefficient of a boundary of the room as a function of the one or more values.

A further embodiment includes a device carrying logic executable by one or more processors to process data corresponding to a number of sound reflections coming from a room over a selected time interval in response to an impulsive sound. This logic operates to provide an estimate of volume of the room as a function of the number of sound reflections and the selected time interval.

Still a further embodiment includes means for detecting a number of sound reflections in a room in response to an impulsive sound; and means for estimating at least one of volume of the room, a dimension of the room, and an acoustic absorption coefficient of the room from the number of sound reflections based on a mirror image reflection model of an impulse response of the room.

In yet a further embodiment of the present invention, a system includes a sensor for detecting sound and a processing subsystem to receive sound-representative signals from the sensor. The processing subsystem is operable to determine volume of the room as a function of a number of sound reflections in response to an impulsive sound. This determination can be made based on a mirror image reflection model of an impulse response of the room.

In still another embodiment, a system, method, apparatus, or device of the present invention is provided with a hearing aid or other hearing assistance device, a hands-free telephony arrangement, a speech recognition arrangement, a telepresence/teleconference configuration, and/or sound level evaluation equipment. As used herein, "hearing assistance device" broadly includes any type of hearing aid, any type of sensory-based hearing prosthetic, a cochlear implant, an implantable hearing device, a vibrotactile or electrotactile hearing device, and/or any type of hearing enhancement, surveillance, or listening device whether for a hearing-impaired listener or a listener with normal hearing, just to name a few examples.

In a further embodiment, a system includes one or more acoustic sensors and a processing subsystem. The system determines the volume of a room, the dimensions of the room, and/or at least one absorption coefficient of the room from a measurement at one or more sensor locations. The processing subsystem employs a routine for estimating volume of the room based on the observed density of reflections. Optionally, this volumetric-directed routine is followed by an iterative optimization routine to correspondingly find the length, width, and/or height of the room, as well as absorption coefficients of the room boundaries, by matching the observed reflections to the simulated reflections of a model of the actual room.

In still a further embodiment, a memory device includes instructions executable by a processor to evaluate an acoustic impulse response of a room, establish a number of acoustic reflections corresponding to the impulse response, and determine volume of the room as a function of the number of reflections. If desired, the instructions, when executed, can optionally be configured to determine one or more dimensions of the room (such as length, width, or height), and/or one or more values corresponding to at least one absorption coefficient for the room as a function of the volume. In one form, the memory device is removable and is of a disk, cartridge, or tape type.

These various embodiments may be used in conjunction with a hearing aid, or other apparatus that requires information concerning the acoustic conditions of the surroundings. The information derived from these estimates may be further used to control other signal processing algorithms or be used for some form of system control.

Other embodiments, forms, features, advantages, aspects, and benefits of the present invention shall become apparent from the detailed description and figures included herein.

DETAILED DESCRIPTION

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

Figure 1:
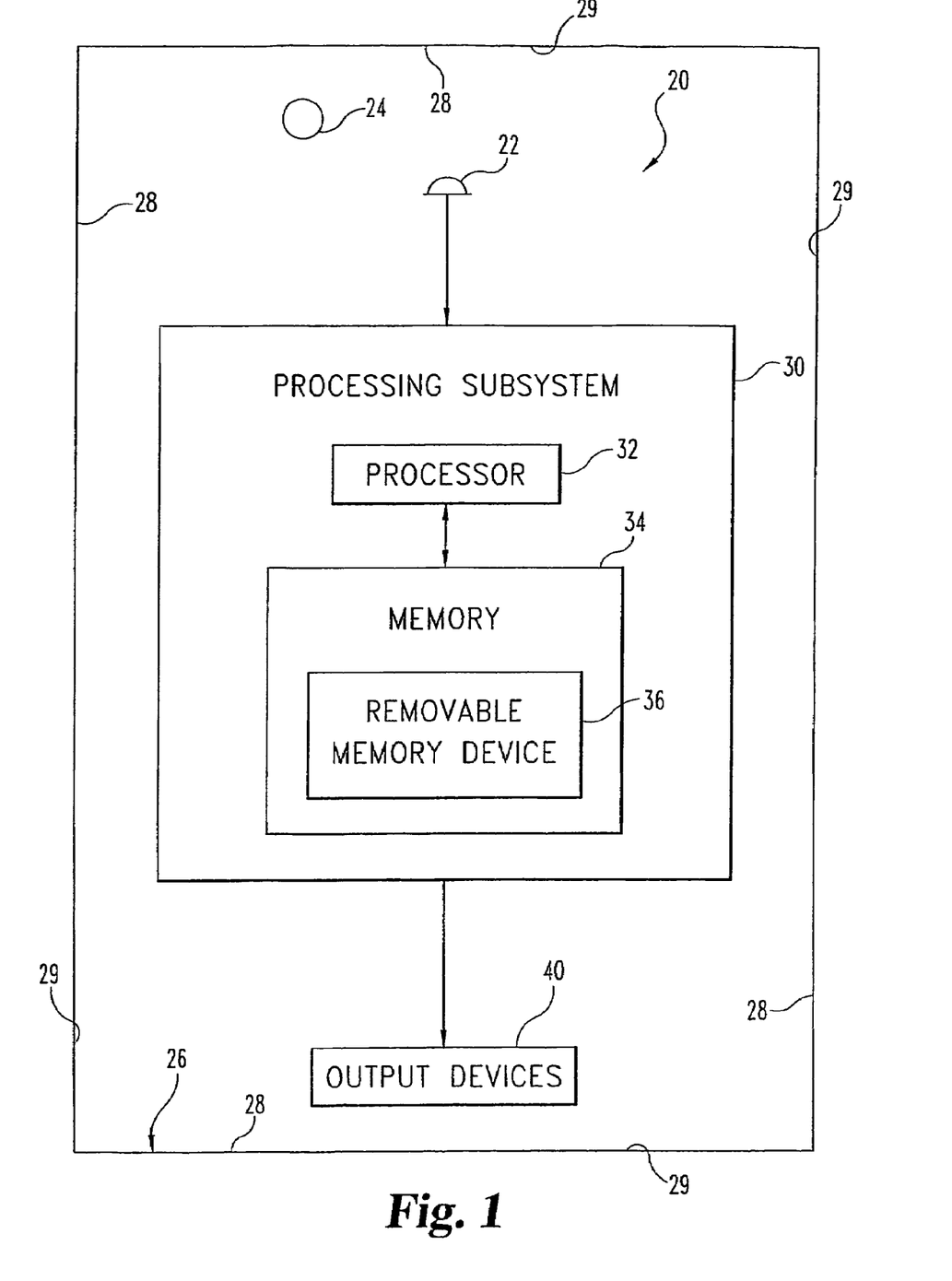
FIG. 1 is a schematic view of an evaluation system.

FIG. 1 illustrates evaluation system 20 of one embodiment of the present invention. System 20 is configured to detect sound with sensor 22 emanating from at least one acoustic source 24 in room 26. Sensor 22 generates a corresponding sensor signal representative of the detected sound. For the example illustrated, only one sensor 22 is shown; however, more than one sensor may be utilized. Sensor 22 can be in the form of an omnidirectional dynamic microphone or a different type of microphone or sensor type as would occur to one skilled in the art. Sources 24 can be actively controlled and/or uncontrolled. In one form, source 24 is operable to generate an impulsive sound of desired duration, intensity, harmonic/spectral content, envelope, and/or other character as desired to perform certain operations described hereinafter. It should be appreciated that in other embodiments, there may be a greater number of sensors 22 and/or sources 24 (not shown). Room 26 is at least partially bounded by walls 28 that are schematically represented in FIG. 1. Walls 28 each include coextensive surface 29.

System 20 further includes processing subsystem 30. Subsystem 30 includes at least one processor 32 and memory 34. Memory 34 includes removable memory device 36. Sensor 22 is operatively coupled to processing subsystem 30 to process signals received therefrom. Processing subsystem 30 is operable to provide an output signal representative of acoustic excitation (sound) detected with sensor 22 that may be modified in accordance with processing routines and/or parameters of subsystem 30. This output signal is provided to one or more output devices 40. In FIG. 1, the one or more output devices 40 are labeled in the plural, but are also intended to be representative of the presence of only a single output device. In one embodiment, at least one of output devices 40 presents an output to a user in the form of an audible or visual signal. In other embodiments, at least one of output devices 40 provides a different user/operator output and/or is in the form of other equipment that utilizes the output signal for further processing. In still other embodiments, one or more output devices 40 are absent (not shown).

Subsystem 30 includes appropriate signal conditioning/conversion to provide a sound-representative signal to processor 32 from sensor 22. Processor 32 is responsive to such sensor-based signals. Processor 32 can be of an analog type, digital type, or a combination of these; and may be a programmable device responsive to instructions, a state machine implemented by dedicated hardware, or a combination of both programmable and dedicated hardware. Furthermore, processor 32 can be comprised of one or more components and/or can include one or more independently operable processing components. For a form with multiple independently operable processing components; distributed, pipelined, and/or parallel processing can be utilized as appropriate. In one embodiment, processor 32 is in the form of a digitally programmable signal processing semiconductor component that is highly integrated. In other embodiments, processor 32 may be of a general purpose type or other arrangement as would occur to those skilled in the art.

Likewise, memory 34 can be variously configured as would occur to those skilled in the art. Memory 34 can include one or more types of solid-state electronic memory, magnetic memory, or optical memory of the volatile and/or nonvolatile variety. Furthermore, memory 34 can be integral with one or more other components of processing subsystem 30 and/or comprised of one or more distinct components. For instance, memory 34 can be at least partially integrated with processor 32. Removable Memory Device (RMD) 36 is of a computer/processor accessible type that is portable, such that it can be used to transport data and/or operating instructions to/from subsystem 30. Device 36 can be of a floppy disk, cartridge, or tape form of removable electromagnetic recording media; an optical disk, such as a CD or DVD type; an electrically reprogrammable solid-state type of nonvolatile memory, and/or such different variety as would occur to those skilled in the art. Nonetheless, in other embodiments, device 36 may be absent.

Generally, operating logic of subsystem 30 is executed to perform one or more desired procedures, processes, operations, and/or routines. In one embodiment, device 36 is utilized to load and/or store at least a portion of the operating logic for subsystem 30—such logic being in the form of software instructions. In other embodiments, some or all of this operating logic is stored in another portion of memory 34, and/or is defined by dedicated logic of subsystem 30 and/or processor 32. As an addition or alternative to memory software instructions stored in memory 34, the operating logic of processing subsystem 30 can be in the form of firmware instructions included/stored in subsystem 30 and/or dedicated hardware of subsystem 30 embodying such logic. When of a hardware type, the operating logic may form at least a part of processor 32.

Processing subsystem 30 can include one or more signal conditioners/filters to filter and condition input signals and/or output signals; one or more format converters, such as Analog-to-Digital (A/D) and/or Digital-to-Analog (DAC) converter types; and/or one or more oscillators, control clocks, interfaces, limiters, power supplies, communication ports, or other types of components/devices as would occur to those skilled in the art to implement the present invention. In one embodiment, subsystem 30 is based on a highly integrated, semiconductor processing component or set of components that include processor 32 and at least a portion of memory 34.

System 20 can be implemented in any of a number of various ways in different embodiments. By way of nonlimiting example, system 20 can be utilized in hearing assistance devices for the hearing impaired, such as hearing aids; sound and/or audio evaluation equipment; speech recognition devices, hands-free telephony equipment, remote telepresence/teleconferencing devices, sound evaluation equipment, or such different devices as would occur to those skilled in the art. Indeed, the evaluation of one or more room size parameters (such as volume, length, width, or height) is often desired to improve performance of acoustic, sound, and/or audio signal processing. It should be understood that the various embodiments, variations, and forms described in connection with system 20, are but a few examples of arrangements that can be used to implement the procedures, processes, operations, routines, and applications described in the text hereinafter that accompany or refer to FIGS. 2-12.

Figure 2:
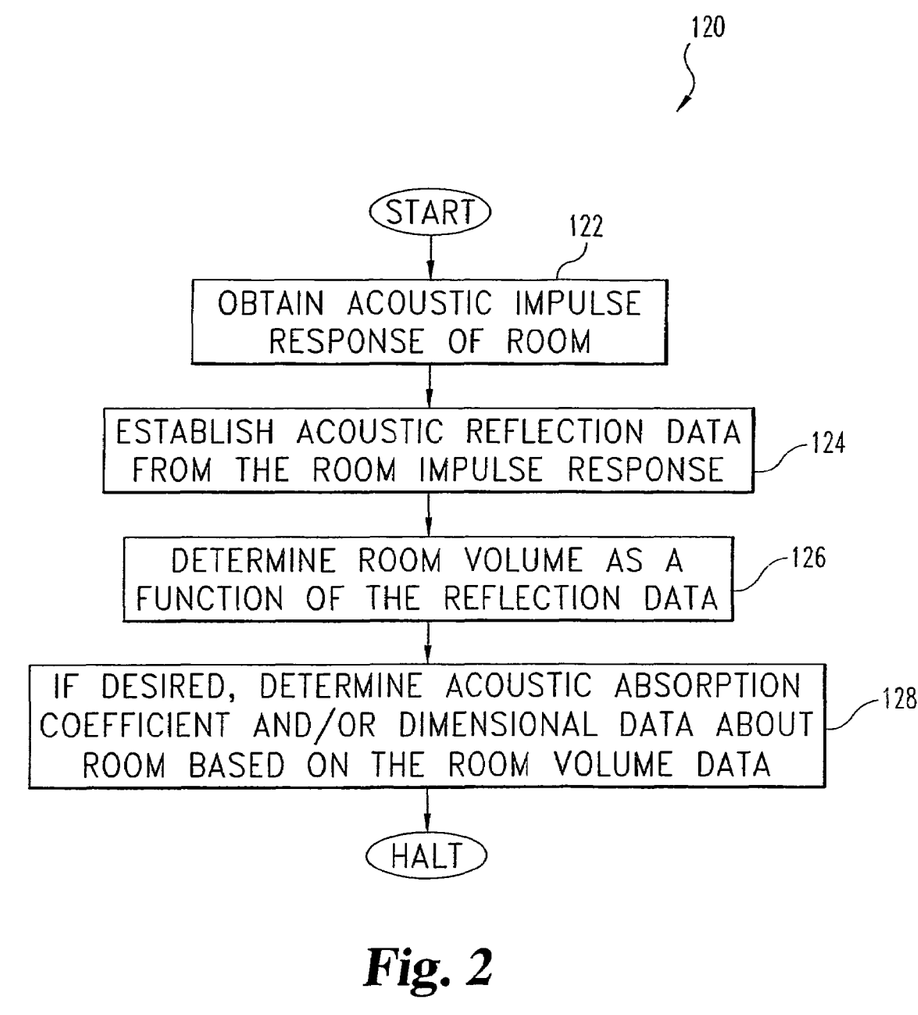
FIG. 2 is a flowchart illustrating a procedure for determining room volume, and optionally one or more room dimensions and/or at least one absorption coefficient, that can be implemented with the system of FIG. 1.

FIG. 2 illustrates evaluation procedure 120 in flowchart form that can be implemented with system 20—utilizing operating logic of subsystem 30 to perform one or more of the operations of procedure 120, as appropriate. Procedure 120 begins with operation 122 in which data corresponding to the acoustic impulse response of a room is gathered. For a system 20 implementation, impulse response data for room 26 can be provided by detecting an sound with sensor 22 that results from an impulsive acoustic output generated with source 24. The detected sound can then be converted to a suitable form for storage in memory 34 in accordance with operating logic of subsystem 30. For example, an electrical signal from sensor 22 that is representative of the acoustic response of room 26 can be digitized by subsystem 30 and stored as corresponding binary data either in a compressed or uncompressed format. Alternatively or additionally, another sound recording medium of (not shown) can be utilized that is subsequently analyzed with subsystem 30. Such a medium could be of an analog type (such as an electromagnetic recording tape) or a digital type (such as a digitally encoded disk), to name just a couple of nonlimiting examples.

From operation 122, procedure 120 continues with operation 124. It should be appreciated that the impulse response detected in operation 122 is generally comprised of the initial, direct sound output by source 24 and sounds reflected by the boundaries of room 26. In operation 124, data representative of these sound reflections is established with processing subsystem 30. Generally, the response of a room to an impulsive or transient signal can be characterized by a set of delayed, scaled, and possibly filtered, versions of the original source signal. It has been discovered that the spatial volume of a room can be determined within a given error range from the impulse response as a function of the time delays of the reflections. It should be appreciated that these reflection time delays are typically independent of details regarding the source signal and absorptive properties of the room boundaries; they are typically just a function of room volume. Such reflections can be characterized by a mirror image source model. Consider a room with straight, planar walls joined together at right angles to define a volume V of a cuboid shape (including a cube or rectangular parallelepiped) that contains a single acoustic signal source. For this room, the mirror images and "mirror rooms" extend to infinity in all directions, in a rectangular pattern. Now consider a sphere with a radius of cT centered on some observation point x in the real room. The number of mirror images N (including the source) inside the sphere is estimated by equation (1) as follows:

$$\tilde{N} = \frac{4\pi}{3V}(cT)^3; \quad (1)$$

where, c represents sound propagation velocity and N estimates the number of reflections observed at x for the time period T seconds (s) after the sound is initially generated from the acoustic source. Rearranging equation (1), the room volume V can be estimated as $\tilde{V}$ as reflected in equation (2) that follows:

$$\tilde{V} = \frac{4\pi}{3N!}(cT)^3 \quad (2)$$

Accordingly, data determined in operation 124 includes extraction of the time delay and amplitude information for the initial N number of reflections. Procedure 120 next performs operation 126 in which room volume is determined from N, c, and T in accordance with equation (2), subject to various factors that influence accuracy of the estimate, as further explained hereinafter.

It should be appreciated that the accuracy of equation (2) depends on the accuracy with which N, c, and T can be observed. Letting an uncertainty of these variables be $\delta N$, $\delta c$ and $\delta T$, respectively, with all assumed to be normally distributed, equation (3) follows:

$$\left(\frac{\delta \tilde{V}}{\tilde{V}}\right)^2 = \left(3\frac{\delta c}{c}\right)^2 + \left(3\frac{\delta T}{T}\right)^2 + \left(\frac{\delta N}{N}\right)^2. \quad (3)$$

A first order approximation of c in terms of the temperature in degrees Celsius, $T_c$, can be expressed as: $c=331+0.6\,T_c$ m/s, and therefore in typical situations ($\delta T_c \approx 7°$ C. maximally), the worst case $\delta c/c$ will be about 0.02. Further, $\delta T$ may be estimated by realizing that the uncertainty in T will be approximately equal to half the separation in time of reflection N and reflection N+1. Rewriting equation (2) to yield T in terms of c, V and N; and differentiating with respect to N, equation (4) results as follows (using $\delta N=1$ and multiplying by ½):

$$\left(\frac{\delta T}{T}\right) = \frac{1}{2} \cdot \frac{1}{3N}. \quad (4)$$

Sources of error for $\delta N/N$ include: (a) the approximation error intrinsic to equation (1) and (b) inaccuracy regarding the proper identification/detection of the reflections. It has been discovered that under typical circumstances, the approximation error of equation (1) can be expressed in accordance with equation (5) as follows:

$$\left(\frac{\delta N}{N}\right)_a = \frac{8}{\sqrt{3}\,N}. \quad (5)$$

In practice, it should be appreciated that because N is an integer, it increases in discrete steps as cT increases. Furthermore, for a particular configuration of acoustic source and observation locations in the room, the actual observed N typically can deviate by as much as eight (positive or negative) with respect to the N given by equation (1). Such a positive deviation could occur if both source and observation locations are nearly in a corner of the room, in which case the direct sound and seven reflections occur for T≈0. The negative deviation case may occur if source and observation locations are at opposite sides of the room. As the mirror image locations are repeated in a regular pattern, this positive or negative deviation does not typically depend on N. Assuming that the uncertainty in N is uniformly distributed on [−8,8], $(\delta N/N)_a = 8/\sqrt{3}$.

The second potential error source, $(\delta N/N)_b$, arises from limitations to the extraction of reflection data. Typically, such limitations result because with increasing N, successive reflections arrive with decreasing separation in time at a given observation location. Also, the amplitude of successive reflections decreases due to geometric spreading and repeated absorption at the room boundaries. To account for these limitations, reflection density can be considered proportional to the square of T, and the reflection amplitude can be considered inversely proportional to T (for negligible absorption at room boundaries). Accordingly, $(\delta N/N)_b$ plausibly increases proportional to the cube of T, which is proportional to N. Using γ for this proportionality, equation (6) follows:

$$\left(\frac{\delta N}{N}\right)_b = \gamma N. \tag{6}$$

The value of γ depends on a number of factors, such as bandwidth of the source and room volume, signal-to-noise ratio, and the like. Combining equations (5) and (6), equation (7) results:

$$\left(\frac{\delta N}{N}\right)^2 = \frac{64}{3N^2} + \gamma^2 N^2. \tag{7}$$

Substituting the foregoing expressions for δT and δN into equation (3), and neglecting δc (because it is typically small), equation (8) results:

$$\left(\frac{\delta \tilde{V}}{\tilde{V}}\right) \approx \frac{22}{N^2} + \gamma^2 N^2. \tag{8}$$

Figure 3:
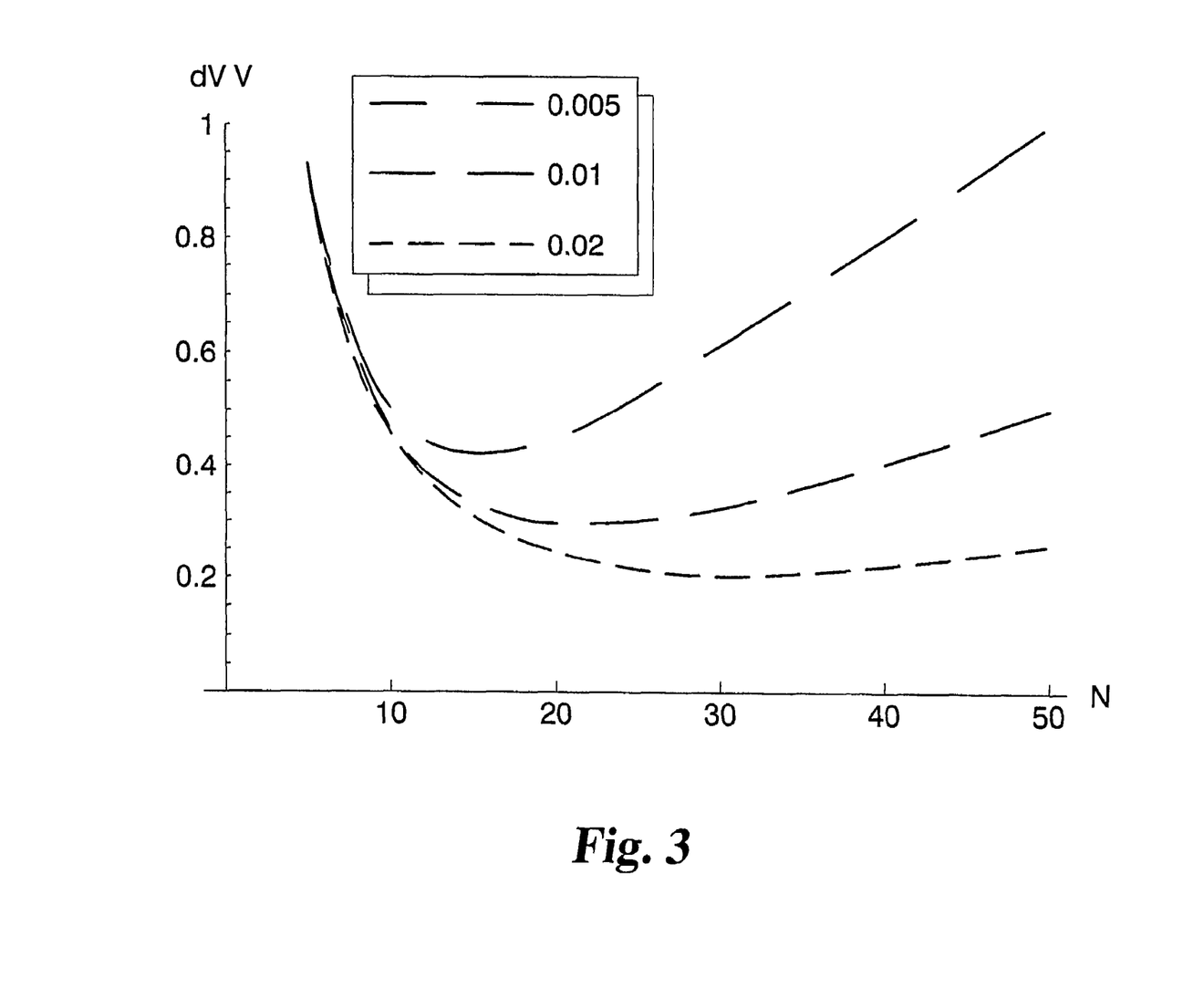
FIG. 3 is a view of a comparative graph of results relating to the procedure of FIG. 2.

Referring additionally to FIG. 3, a graphic representation of the square root of equation (8) is shown for γ=0.005, 0.01, and 0.02; respectively. Accordingly, the accuracy of volume determination in operation 126 depends on a number of factors—such as γ and correspondingly the value of N. In empirical examples, volume was estimated with accuracy in the range of 20% to 40% for the different values of γ shown in FIG. 3. This result also shows that it usually suffices to obtain only about 10-30 reflections (depending on the value of γ) to estimate room volume with a desired level of accuracy.

To determine volume of arbitrarily shaped rooms, the previously described model equation (2) typically will still apply even though theoretically it may not be possible to count the mirror images as a function of cT as straightforwardly as for the cuboid-shaped rooms. This result follows from the discovery that several underlying characteristics are independent of room shape, namely: (i) reverberation time is independent of room shape, (ii) energy density is independent of room shape, and (iii) individual reflections arriving with given delays have expected values for energy that are independent of room shape. As to the independence of reverberation time (item (i) above), consider two arbitrarily shaped rooms A and B with the same surface area S and average absorption coefficient α, it follows that rooms A and B have almost the same reverberation time $T_{60}=V/(6S \ln[(1-\alpha)^{-1}])$. The only condition for this result is that both rooms A and B have a near diffuse reverberant field, which will be the case unless either room is extremely elongated or displays a large variety of different absorption coefficients on the various boundaries. For most rooms with practical geometry and boundary materials, this condition is satisfied.

Such results arise because the volume V for each of two rooms with the same surface area S is typically almost the same, such that a generalized relationship between surface area and volume for any three-dimensional object can be utilized for volume determination of arbitrarily shaped rooms. Specifically, surface area $S=\beta V^{2/3}$, where β depends on the exact geometry of the room being evaluated. It has been empirically discovered that for most existing rooms in practice, $\beta \approx 6.5$. Thus the reverberation time can also be written as $T_{60}=\sqrt{S}/(2.5 \ln[(1-\alpha)^{-1}])$. See J. Borish, *Extension of the Image Model to Arbitrary Polyhedra*, J. Acoust. Soc. Am., 75(6):1827-36 (1984) for further information pertinent to arbitrarily-shaped rooms, which is hereby incorporated by reference in its entirety. Further, reference is made to commonly owned U.S. patent application Ser. No. 10/807,885 to Ratnam et al., filed 24 Mar. 2004 now abandoned, for more information about reverberation time, $T_{60}$, among other things, which is also hereby incorporated by reference in its entirety.

As to the independence of energy density from room shape (item ii above), the energy density, E, of each of rooms A and B is the same for a steady-state source of power, W, as a result of the conservation of energy principle, which can be characterized by equation (9) as follows:

$$E = \frac{4W}{c\alpha S} \tag{9}$$

Alternatively, by adding the energies of all individual mirror images as seen from the observation point $x_A$ in room A, the energy $E_A$ in room A can be expressed by equation (10) as follows:

$$E_A = \sum_{n \in M_A} \frac{e_n}{r_n^2}, \tag{10}$$

where $M_A$ is the set of all visible mirror images of room A at observation point $x_A$; $e_n$ is the energy of mirror image n, and $r_n$ is its distance to observation point $x_A$. An analogous expression holds for room B.

Turning to item (iii) above regarding independence from room shape of expected energy values for individual reflections with given delays, it should be appreciated that the following equation (11) results:

$$E_A(t_1, t_2) = \sum_{n \in D_A} \frac{e_n}{r_n^2}, \tag{11}$$

where: $D_A(t_1,t_2) = \{n \in M_A | ct_1 < r_n < ct_2\}$ yielding the energy density in observation point $x_A$, in room A, of reflections arriving between $t_1$ and $t_2$. Because rooms A and B have nearly the same reverberation time and the same total energy density W, equation (12) follows:

$$E_A(t_1,t_2) \approx E_B(t_1,t_2), \forall t_1,t_2 \tag{12}$$

In equation (13) that follows, η represents the individual summation terms of equation (11):

$$\eta(t) = \frac{e_n}{r_n^2} = \frac{(1-\alpha)^{ct/l_c}}{(ct)^2}, \tag{13}$$

using $l_c=4V/S$ for the mean free path, which is independent of room shape. The variable η is stochastic, but its probabilistic distribution is the same for rooms A and B, given that rooms A and B were defined to have equal α and S. Specifically, both distributions have equal mean values $\eta(t_\mu)$, where $t_\mu=((t_1+t_2)/$ 2). Correspondingly, it follows with high probability that rooms A and B have almost equal V, and therefore almost equal $l_c$. Therefore, using the same η for rooms A and B, equation (11) can be rewritten by virtue of equation (12) as the following equation (14):

$$\left[\sum_{n \in D_A} \eta(t_n) \approx N_A \cdot \eta(t_\mu)\right] = \left[N_B \cdot \eta(t_\mu) \approx \sum_{n \in D_B} \eta(t_n)\right], \quad (14)$$

where $N_{A,B}$ are the number of elements in $D_{A,B}$, respectively (the number of reflections in interval $(t_1, t_2)$ in rooms A and B). From this expression it follows that $N_A \approx N_B$—such that the number of reflections during interval $(t_1,t_2)$ is approximately the same for each of rooms A and B. Because the same result follows for any interval $(t_1,t_2)$, it can be applied to the entire impulse response, thereby demonstrating that equation (2) is valid regardless of room shape, with the condition that an approximately diffuse reverberant-field exists.

Referring again to procedure 120 of FIG. 2, equation (2) can be applied to determine volume V in operation 126 for a room of arbitrary shape, with a degree of error that generally varies with the departure of the room's shape from a rectangular parallelepiped. Given that rooms typically are of a general cubic or rectangular parallelepiped type, this error will be of manageable significance for many applications. A few example applications are provided in connection with FIG. 4, hereinafter.

It has been surprisingly discovered that the acoustic impulse response of a room not only includes volumetric information, but also can convey information about the geometry of the room, including its average absorption coefficient. Although the spatial sampling of the sound field at a single microphone location would seem to preclude inferring any spatial information, contrary to such conventional wisdom the geometry of a room can be inferred from the impulse response. In correspondence to this discovery, procedure 120 continues with optional operation 128 of FIG. 2. In operation 128, the volumetric information from operation 126 is used to determine one or more dimensions of a room and/or at least one acoustic absorption coefficient at a corresponding room boundary. Presuming that any given combination of room geometry and source/receiver configuration transforms uniquely into an associated impulse response, and vice versa, a representative function $f$ can be established, such that: $f: R^{10} \rightarrow R^M$, where the ten input variables are the three linear dimensions of the room; the average absorption coefficient, α, and six coordinates to uniquely define the position of the source and the position of the receiver. The M output variables are the delays and amplitudes of the M/2 number of reflections, depending on how many reflections are calculated (extracted) from the room impulse response.

Function f is simple (image model), and it is hypothesized that there is a unique inverse function. However, no procedure is known for inverting function f (specifically, not in closed form), and thereby computing room parameters from the an impulse response. However, it has surprisingly been found that the room response can be inverted by employing iterative optimization techniques. Through such techniques, an estimate of the room geometry and source/receiver configuration can be established and utilized to generate a corresponding estimation of the impulse response. The estimated and observed impulse responses can be compared by using an objective (or error) function h to evaluate similarity (see, for example, equation (19) below). Subsequently, the initial estimate of the configuration and corresponding impulse response are refined until the difference between the estimated and observed impulse response are within a desired error range, an allotted amount of computing time is expended, a combination of these, and/or such different criteria are satisfied as would occur to those skilled in the art. After optional dimensional and/or absorption coefficient information is obtained in operation 128, procedure 120 terminates until performed again.

Considering the interative determination of dimensional and/or absorption coefficient information of operation 128 in more detail, a "brute force" interative approach can be used that includes trying a large number of possible configurations and selecting the one with the best result. In other embodiments, iterative processing time potentially can be reduced compared to this brute force approach by using one or more other techniques, such as simulated annealing, genetic processing, and the like. Simulated annealing is further described by: S. Kirkpatrick, C. D. Gelatt Jr. et al., *Optimization by Simulated Annealing*, Science 220(4598):671-680 (1983); S. Kirkpatrick, *Optimization by Simulated Annealing: Quantitative Studies*, J. Stat. Phys., 34(5/6):975-986 (1984); N. Metropolis, A. W. Rosenbluth et al., *Equation of State Calculations by Fast Computing Machines*, J. Chem. Phys., 21(6):1087-1092 (1953); *Simulated Annealing: Parallelization Techniques*, R. Azencott editor, (John Wiley & Sons) (1992); all of which are hereby incorporated by reference each in its entirety. Even though a determination of h by simulated annealing can have many local minima, a suitable cooling schedule for the annealing algorithm can be utilized to find the global minimum of h with probability 1. Further information about this cooling schedule approach can be found in B. Hajek, *Cooling Schedules for Optimal Annealing*, Math. of Operations Res., 13( )2):311-329 (1988), which is hereby incorporated by reference in its entirety. An experiment was performed with simulated data for a rectangular room, with "true" dimensions and average absorption coefficient α as given in Table I as follows:

TABLE I

|  | true | estimated |
| --- | --- | --- |
| width (m) | 5.35 | 5.95 |
| depth (m) | 9.60 | 0.06 |
| height (m) | 2.98 | 2.94 |
| volume (m$^3$) | 153 | 158 |
| α | 0.300 | 0.302 |

The mirror image model was used to calculate time delay and amplitude of the first two reflection orders, and input into the 'geometry-finding' algorithm. First, an estimate of the volume was made according to equation (2), which led to estimates for width, length and height of the room (taken as $V^{1/3}$); a was set to 0.5 initially. The simulated annealing algorithm was run for 4000 iterations, at which point the error given by the objective function of equation (19) (see below) decreased by about 22 dB. The values of the estimated room parameters are also given in Table I. The accuracy of the estimate for this particular example is within the typical range from other experiments, demonstrating validity of the approach.

An alternative and somewhat similar approach to find the room geometry is to use a genetic algorithm in operation 128. A genetic algorithm approach is further described by K. S. Tang, K. F. Man et al., *Genetic Algorithms and their Applications*, IEEE Signal Proc. Mag., 13(6):22-37 (1996), which is also hereby incorporated by reference in its entirety. With such an algorithm, multiple successful (in terms of having a low error function value) parameter vectors can be recombined to produce 'offspring' parameters, which may be more successful than the 'parents' if good parameters from both parents are combined in the offspring. It is possible that such an approach will lead to a more rapid convergence to the global minimum of h. As in simulated annealing, genetic algorithms also allow random perturbations (i.e. mutations) of the parameters in the search for the global minimum.

Many different forms and embodiments of the inventive aspects of the present application are envisioned. In one embodiment, one or more of the following stages are performed:

(a) Establishing a room impulse response by recording the room response to a suitably "impulsive" acoustic signal. Such signal may be actively or passively provided. Alternatively or additionally, the impulse response is blindly estimated based on an arbitrary ambient signal, as described in Y. Huang and J. Benesty, "A Class of Frequency-Domain Adaptive Approaches to Blind Multichannel Identification," *IEEE Trans. Signal Proc.*, 51(1):11-24 (2003) and J. Benesty, *Adaptive Eigenvalue Decomposition Algorithm for Passive Acoustic Source Localization*, J. Acoustic Soc. Am., 107(1):384-391 (2000), both of which are hereby incorporated by reference each in its entirety.

(b) Determining the first N reflections from the impulse response information, including the time delay and amplitude of each reflection. For a recording of an impulsive sound, the reflection data can be extracted based on S. Charleston, M. R. Azimi-Sadjadi et al., *Interference Cancellation in Respiratory Sounds via a Multiresolution Joint Time-Delay and Signal-Estimation Scheme*, IEEE Trans. Biomed. Eng., 44(10): 1006-1019 (1997); M. R. Azimi-Sadjadi, S. Charleston et al., *A New Time Estimation in Subbands for Resolving Multiple Specular Reflections*, IEEE Trans. on Sign. Proc., 46(12):3398-3403 (1998); and/or M. S. O'Brien et al., "Recovery of a sparse spike time series by L1 norm deconvolution", IEEE Trans. Signal Proc., 42(12):3353-3365 (1994) (This method of sparse spike inversion has been found particularly suitable for extracting reflection data from an impulse response.); all of which are hereby incorporated by reference each in its entirety.

(c) Estimating room volume V from equation (2). Optionally, room dimensions can be estimated based on $V^{1/3}$. For a room that is generally a cube, a can be estimated through Sabine's or Eyring's reverberation time formula: $T_{60}=V/6\alpha S$ or $T_{60}=V/(6S \ln[(1-\alpha)^{-1}])$. Otherwise, S can be estimated from V, and $T_{60}$ can be estimated in the standard fashion from a sufficient number of reflections. Estimates for source and receiver positions are also made for this determination.

(d) Calculating delay and amplitude of the first few reflection orders (typically two reflection orders) based on the mirror image model.

(e) Performing a simulated annealing procedure to optimize unknown configuration parameters for dimension and/or absorption coefficient determination. Comparisons are made between the estimated (modeled) to and observed reflection parameters until within a desired error range or other criterion is met, where the comparison is in accordance with the objective function of equation (19) as follows:

$$h(\overline{\theta}_o, \overline{\theta}_m) = \sum_i \beta_i(\theta_{o,i} - \theta_{m,i})^2 \quad (19)$$

where the $\overline{\theta}$ are the reflection parameter vectors (time delay and amplitude), the subscript o indexes the observed reflections and the subscript m indexes the modeled reflections. The $\beta_i$ are scaling parameters. A suitable "cooling schedule" may be utilized to optimize convergence.

In a further embodiment, dimensional and or absorption coefficients are not determined—instead estimating just volume information. In other embodiments, a computer and/or processor accessible device includes operating logic that is configured to execute one or more inventive aspects of the present application. In still other embodiments, innovative applications are provided that include one or more aspects of the volume, dimension, and/or absorption coefficient estimation techniques of the present application.

Figure 4:
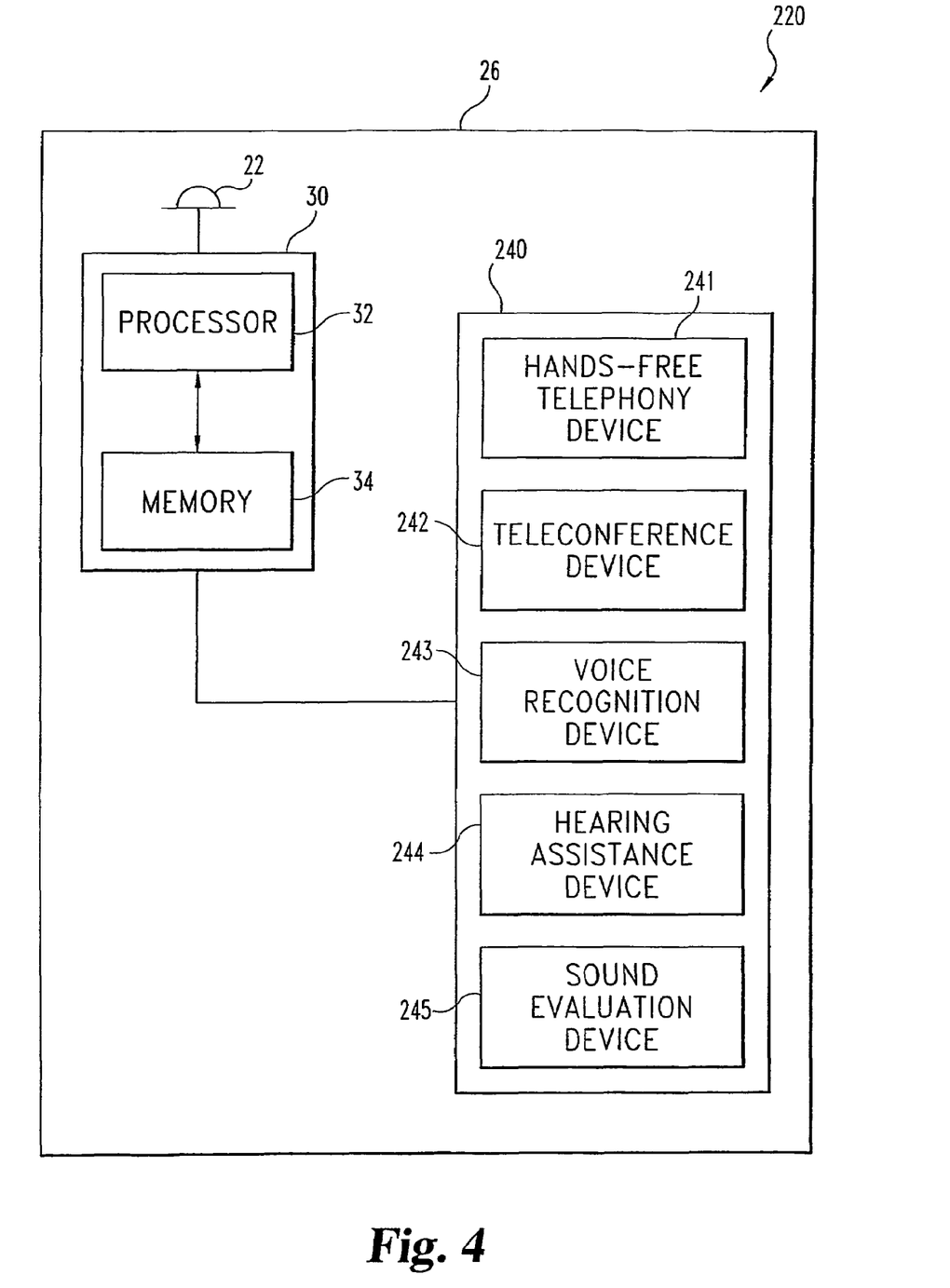
FIG. 4 is a schematic view of an arrangement of various applications of the procedure of FIG. 2 that can be implemented with the system of FIG. 1.

For example, FIG. 4 illustrates several nonlimiting examples of applications utilizing system 20 and/or procedure 120. FIG. 4 depicts arrangement 220 of various applications of the volume, and/or dimensional/absorption coefficient information obtained according to procedure 120; where like reference numerals refer to like features previously described in connection with system 20. Arrangement 220 includes sensor 22 operatively coupled to processing subsystem 30 in room 26. Subsystem 30 includes operating logic to perform the operations described in connection with procedure 120.

Arrangement 220 includes device 240 which are coupled to subsystem 30 to receive volume, and optionally dimensional and/or acoustic absorption coefficient information for further processing (collectively "room evaluation data"). Devices 240 embody a number of different examples of applications, including hands-free telephony device 241, teleconference/telepresence device 242, voice recognition device 243, hearing assistance device 244, and sound evaluation device 245. Each of devices 240 utilizes the room evaluation data in a corresponding telephony, teleconference/telepresence, hearing assistance, or sound evaluation data processing routine, respectively. Such routines can be executed, at least in part, with subsystem 30 and/or the corresponding device 240. While shown together for convenience of illustration, it should be understood that an alternative embodiment includes only one of devices 240 integrated with subsystem 30 and/or sensor 22—providing an application-specific implementation according to the present invention. One example of this type is a multimode hearing aid. Programmable hearing aids often have the ability to switch between several processing schemes depending on the listening environment. For instance, in highly diffusive environments, where the source-to-listener distance exceeds the critical distance, adaptive beamformers are ineffective. In such situations, it would be convenient to switch off the adaptive algorithm and revert to the relatively simple (fixed) delay-and-sum beamformer. Alternatively, in highly-confined listening environments such as automobile interiors, where a reflecting surface is located in close proximity to the ear, it may be convenient to switch-off the proximal ear microphone, and use the input from the microphone located in the better (more distal) ear. Switching between such options can potentially be based, at least in part, on volume, dimension, and/or acoustic absorption coefficient information and/or other room characterizing data such as reverberation time and the like. In other embodiments, one or more of the other device types shown may not be utilized and/or utilized in different quantity. Alternatively or additionally, one or more of devices 240 can be combined with one or more other of devices 240.

Any theory, mechanism of operation, proof, or finding stated herein is meant to further enhance understanding of the present invention and is not intended to make the present invention in any way dependent upon such theory, mechanism of operation, proof, or finding. While the invention has been illustrated and described in detail in the figures and foregoing description, the same is to be considered as illustrative and not restrictive in character, it being understood that only selected embodiments have been shown and described and that all changes, modifications and equivalents that come within the spirit of the invention as defined herein or as follows are desired to be protected.

What is claimed is:

1. A method, comprising:
   detecting sound coming from a room;
   establishing an acoustic impulse response of the room;
   determining a number of sound reflections corresponding to the impulse response; and
   determining volume of the room as a function of the sound reflections.

2. The method of claim 1, which includes determining at least one value corresponding to a dimension of the room from the volume.

3. The method of claim 1, which includes determining at least one value corresponding to an absorption coefficient at a boundary of the room from the volume.

4. A method, comprising:
   detecting sound reflected from one or more surfaces of a room;
   counting a number of sound reflections from the one or more surfaces over a selected time interval; and
   estimating volume of the room as a function of the number of sound reflections and the time interval.

5. The method of claim 4, which includes generating an impulsive sound to cause the sound reflected from the one or more surfaces.

6. The method of claim 4, which includes determining at least one of a dimension of the room and an acoustic absorption coefficient of a boundary of the room.

7. The method of claim 4, wherein the function corresponds to $V=(4\pi/3N)(cT)^3$ with V representing the volume of the room, N representing the number of the sound reflections, c representing sound propagation velocity, and T representing the selected time interval.

8. The method of claim 4, wherein:
   said detecting is performed with at least one microphone; and
   said counting and said estimating are performed with one or more processors.

9. The method of claim 8, wherein said microphone and said one or more processors are included in a hearing assistance device.

10. A method, comprising:
    detecting a number of sound reflections of a room in response to an impulsive sound;
    determining one or more values corresponding to reverberation time from the number of sound reflections based on a mirror image reflection model; and
    estimating at least one of a dimension of the room and an acoustic absorption coefficient of a boundary of the room as a function of the one or more values.

11. The method of claim 10, wherein said determining includes estimating volume of the room and determining the one or more values from the volume of the room.

12. The method of claim 10, wherein said determining includes calculating delay and amplitude of the number of reflections.

13. The method of claim 10, wherein said determining includes performing an annealing routine.

14. The method of claim 10, which includes generating the impulsive sound.

15. An apparatus, comprising: a device carrying logic executable by one or more processors to process data corresponding to a number of sound reflections coming from a room over an selected time interval in response to an impulsive sound, the logic being operable to provide an estimate of volume of the room as a function of the number of sound reflections and the selected time interval.

16. The apparatus of claim 15, wherein the logic includes a number of software instructions and the device includes a computer-readable memory storing the software instructions.

17. The apparatus of claim 16, wherein the computer-readable memory is of a removable memory device type.

18. The apparatus of claim 15, wherein the logic operates with the function corresponding to $V=(4\pi/3N)(cT)_3$; with V representing the volume of the room, N representing the number of the sound reflections, c representing sound propagation velocity, and T representing the selected time interval.

19. The apparatus of claim 15, wherein the logic further operates to estimate at least one of a dimension of the room and an acoustic absorption coefficient of a boundary of the room.

20. The apparatus of claim 15, wherein the volume is determined with a mirror image reflection model of an impulse response of the room.

21. A system, comprising:
    a sensor for detecting sound; and
    a processing subsystem operable to receive sound-representative signals from the sensor to determine volume of a room as a function of a number of sound reflections of the room in response to an impulsive sound based on a mirror image reflection model of an impulse response of the room.

22. The system of claim 21, wherein the function corresponds to $V=(4\pi/3N)(cT)^3$; with V representing the volume of the room, N representing the number of the sound reflections, c representing sound propagation velocity, and T representing the selected time interval.

23. The system of claim 21, wherein the processing subsystem includes means for estimating at least one of a dimension of the room and an acoustic absorption parameter of a boundary of the room.

24. The system of claim 21, further comprising an output device selectively responsive to the volume of the room.

25. The system of claim 21, wherein the processing subsystem includes means for recording the sound-representative signals.

* * * * *